US010370899B2

(12) United States Patent
Dewald et al.

(10) Patent No.: US 10,370,899 B2
(45) Date of Patent: Aug. 6, 2019

(54) MUD SAVER VALVE MEASUREMENT SYSTEM AND METHOD (71) Applicant: Nabors Drilling Technologies USA, Inc., Houston, TX (US)

(72) Inventors: Brian Dale Dewald, Calgary (CA); Doug Christian Greening, Calgary (CA); Ryan Edward Graham, Calgary (CA)

(73) Assignee: Nabros Drilling Technologies USA, Inc., Houston, TX (US)

( * ) Notice: Subject to any disclaimer, the term of this patent is extended or adjusted under 35 U.S.C. 154(b) by 222 days.

(21) Appl. No.: 15/589,746

(22) Filed: May 8, 2017

(65) Prior Publication Data

US 2017/0321484 A1    Nov. 9, 2017

Related U.S. Application Data (60) Provisional application No. 62/333,694, filed on May 9, 2016.

(51) Int. Cl.
*E21B 3/02* (2006.01)
*E21B 47/01* (2012.01)
*E21B 21/10* (2006.01)
*G01L 5/00* (2006.01)

(52) U.S. Cl.
CPC .............. *E21B 3/02* (2013.01); *E21B 21/106* (2013.01); *E21B 47/01* (2013.01); *G01L 5/0061* (2013.01)

(58) Field of Classification Search
CPC .......... E21B 3/02; E21B 21/106; E21B 47/01; E21B 47/00; E21B 7/00; G01L 5/0061
See application file for complete search history.

(56) References Cited

U.S. PATENT DOCUMENTS

| 4,479,564 | A | 10/1984 | Tanguy |
| 4,715,451 | A | 12/1987 | Bseisu et al. |
| 5,272,925 | A | 12/1993 | Henneuse et al. |

(Continued)

FOREIGN PATENT DOCUMENTS

WO    2013/142950    10/2013

OTHER PUBLICATIONS

PCT ISR and Written Opinion for PCT/US14/065772 dated Jul. 23, 2015.

(Continued)

*Primary Examiner* — Wei Wang
(74) *Attorney, Agent, or Firm* — Enrique Abarca; Abel Schillinger, LLP (57) ABSTRACT In accordance with an embodiment of the disclosure, a method includes detecting a first parameter indicative of lateral movement of a top drive system with respect to a rotational axis of the top drive system with a first plurality of sensors and detecting a second parameter indicative of lateral movement of the top drive system with respect to the longitudinal axis of the top drive system with a second plurality of sensors. The first parameter is different from the second parameter. The method also includes transmitting the first parameter and the second parameter to a monitoring system and comparing the first parameter to a first threshold value and comparing the second parameter to a second threshold value with the monitoring system. Detecting the first parameter and the second parameter includes detecting lateral movement of a mud saver valve configured to flow mud through a sealed passage.

20 Claims, 5 Drawing Sheets

(56) References Cited

U.S. PATENT DOCUMENTS

| | | |
|---|---|---|
| 5,358,059 A | 10/1994 | Ho |
| 6,315,062 B1 | 11/2001 | Alft et al. |
| 2005/0071120 A1 | 3/2005 | Hutchinson |
| 2005/0109097 A1 | 5/2005 | Bogath et al. |
| 2005/0167157 A1 | 8/2005 | Boyadjieff |
| 2006/0065395 A1 | 3/2006 | Snell |
| 2006/0124353 A1 | 6/2006 | Juhasz et al. |
| 2008/0125876 A1 | 5/2008 | Boutwell |
| 2008/0202810 A1 | 8/2008 | Gomez |
| 2009/0151934 A1 | 6/2009 | Heidecke et al. |
| 2010/0065336 A1 | 3/2010 | Wells et al. |
| 2010/0214121 A1 | 8/2010 | Puro et al. |
| 2011/0016964 A1 | 1/2011 | Strom |
| 2011/0024188 A1 | 2/2011 | Wassell et al. |
| 2011/0153296 A1 | 6/2011 | Sadlier et al. |
| 2011/0186353 A1 | 8/2011 | Turner |
| 2012/0080227 A1 | 4/2012 | Cardellini et al. |
| 2012/0160517 A1 | 6/2012 | Bouligny et al. |
| 2013/0056275 A1 | 3/2013 | Neidhardt et al. |
| 2015/0021016 A1 | 1/2015 | Deng et al. |
| 2015/0176390 A1 | 6/2015 | Greening et al. |
| 2015/0285055 A1 | 10/2015 | Anderson et al. |

OTHER PUBLICATIONS

Jansen et al, Active Damping of Torsional Drillstring Vibrations With a Hydraulic Top Drive, 1995, SPE Drilling & Completion, Dec. 1995.

Nicholson, An Integrated Approach to Drilling Dynamics Planning, Identification, and Control, 1994 IADC/SPE Drilling Conference held in DAllas, Texas, Feb. 15-18, 1994.

Leine et al, Stick-slip Whirl Interaction in Drillstring Dynamics, 2002, Journal of Vibration and Acoustics Apr. 2002, vol. 124, 209-220.

Christoforou et al, Fully coupled vibrations of actively controlled drillstrings, 2003, Journal of Sound and Vibration.

PCT/US2017/031784 International Search Report and Written Opinion dated Aug. 10, 2017.

MUD SAVER VALVE MEASUREMENT SYSTEM AND METHOD

CROSS REFERENCE TO RELATED APPLICATION

This application is a Non-Provisional application claiming priority to U.S. Provisional Application No. 62/333,694, entitled "MUD SAVER VALVE SYSTEM AND METHOD," filed May 9, 2016, which is hereby incorporated by reference in its entirety for all purposes.

BACKGROUND

Embodiments of the present disclosure relate generally to the field of drilling and processing of wells. More particularly, present embodiments relate to a compact system and method for measuring movement of a top drive system and controlling flow of mud or other drilling fluids during drilling operations.

Top drives are typically utilized in well drilling and maintenance operations, such as operations related to oil and gas exploration. In conventional oil and gas operations, a well is typically drilled to a desired depth with a drill string, which includes drill pipe and a drilling bottom hole assembly (BHA). During a drilling process, the drill string may be supported and hoisted about a drilling rig by a hoisting system for eventual positioning down hole in a well. As the drill string is lowered into the well, a top drive system may rotate the drill string to facilitate drilling.

Once the desired depth is reached, the drill string is removed from the hole and casing is run into the vacant hole. In some conventional operations, the casing may be installed as part of the drilling process (e.g., casing running). A technique that involves running casing at the same time the well is being drilled may be referred to as "casing-while-drilling." Casing may be defined as pipe or tubular that is placed in a well to prevent the well from caving in, to contain fluids, and to assist with efficient extraction of product. When the casing is run into the well, the casing may be gripped and rotated by a top drive.

Drill string and casing may generally be referred to as pipe or tubular. It is now recognized that, when the drill string or casing is run into the well, the top drive and the corresponding pipe may be susceptible to lateral movement (e.g., swirl movement). Such movement may cause undesired stresses on any of various portions of a drilling or casing system. For example, undesired levels of stress may be placed on the drill string, the casing, the top drive, and/or other components of the drilling rig. Further, a flow of mud or other fluid may be pumped through a mud saver valve, which is controlled by an actuator, into the casing/drill string and well to facilitate installation of the casing in the well. Existing measurement systems may be inaccurate and may add unnecessary height (e.g., stack-up height) to the top drive.

BRIEF DESCRIPTION

In accordance with one aspect of the disclosure a system includes a top drive, and a top drive movement measurement system. The top drive measurement system includes a mud saver valve configured to flow drilling fluid through a flow path of the mud saver valve. The mud saver valve includes a valve configured to control the flow of drilling fluid through the flow path, and the mud saver valve is configured to rotate via input of the top drive. The system further includes a mud saver valve housing configured to cover at least a portion of the mud saver valve, a first plurality of sensors of the mud saver valve housing, and a second plurality of sensors. The first plurality of sensors is configured to detect lateral movement of the component of the top drive system, and the second plurality of sensors of the mud saver valve housing is configured to detect one or more compression or tension forces on the mud saver valve of the top drive system.

In accordance with another embodiment of the disclosure a method includes detecting a first parameter indicative of lateral movement of a top drive system with respect to a rotational axis of the top drive system with a first plurality of sensors and detecting a second parameter indicative of lateral movement of the top drive system with respect to the longitudinal axis of the top drive system with a second plurality of sensors. The first parameter is different from the second parameter. The method also includes transmitting the first parameter and the second parameter to a monitoring system and comparing the first parameter to a first threshold value and comparing the second parameter to a second threshold value with the monitoring system. Detecting the first parameter and the second parameter includes detecting lateral movement of a mud saver valve configured to flow mud through a sealed passage.

In accordance with a further aspect of the disclosure a top drive movement measurement system includes a mud saver valve measurement housing configured to be disposed about and couple to a mud saver valve of a top drive system. The mud saver valve measurement housing includes a plurality of sensors of the mud saver valve measurement housing, the plurality of sensors is configured to detect lateral movement, compression, or tension of the mud saver valve of the top drive system. The top drive movement measurement system also includes a monitoring system, including: a signal receiver configured to receive data from the mud saver valve measurement housing; a processor; and one or more non-transitory, computer-readable media having executable instructions stored thereon, the executable instructions including instructions adapted to actuate an alert of the monitoring system when the plurality of sensors detects lateral movement that exceeds a first threshold, the plurality of sensors detects compression or tension that exceeds a second threshold, or both, and the one or more non-transitory, computer-readable media includes at least one value stored thereon, the at least one value corresponds to the first threshold, the second threshold, or both

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Present embodiments provide a mud saver valve measurement system and method for a top drive system during drilling operations. During a drilling or tubular (e.g., casing) running operation, the top drive system may rotate a tubular or string of tubular while the tubular is lowered into a wellbore. During such operations, it may be desirable to circulate fluids (e.g., drilling mud) through the associated drill string. In accordance with present embodiments, a flow of mud or other fluid through the tubular elements and within the wellbore may be regulated during insertion of the tubular or casing elements via a mud saver valve. Further, the flow of mud through the mud saver valve may be controlled by an actuator (e.g., a valve control) disposed within a mud saver valve housing.

Furthermore, it is now recognized that, during drilling or tubular running operation, the top drive system and/or tubular may become off balance and may move or sway from side to side in an oblong or circular motion. To improve monitoring and performance of top drive operations, a mud saver valve measurement system is configured to measure and monitor linear, radial, lateral, and/or circular motion (e.g., swirl) of the top drive and a tubular supported by the top drive during a drilling or tubular running operation. For example, the mud saver valve measurement system may include a sensor module having a linear accelerometer, a gyroscope, strain gauges, or any combination thereof, configured to collect data indicative of linear and/or circular motion (e.g., swirl) of the top drive and the tubular about a longitudinal axis. The mud saver valve measurement system may also include a monitoring station or other monitoring systems configured to analyze the collected data and/or alert a user or operator if the linear and/or circular motion (e.g., swirl) of the top drive and the tubular exceeds a threshold. To conserve vertical space of the top drive, such mud saver valve measurement systems may be integrated with the mud saver valve housing. Further, due at least to the thinner walls of the mud saver valve, the mud saver valve measurement system may more accurately measure stresses and movements of the drill string.

Figure 1:
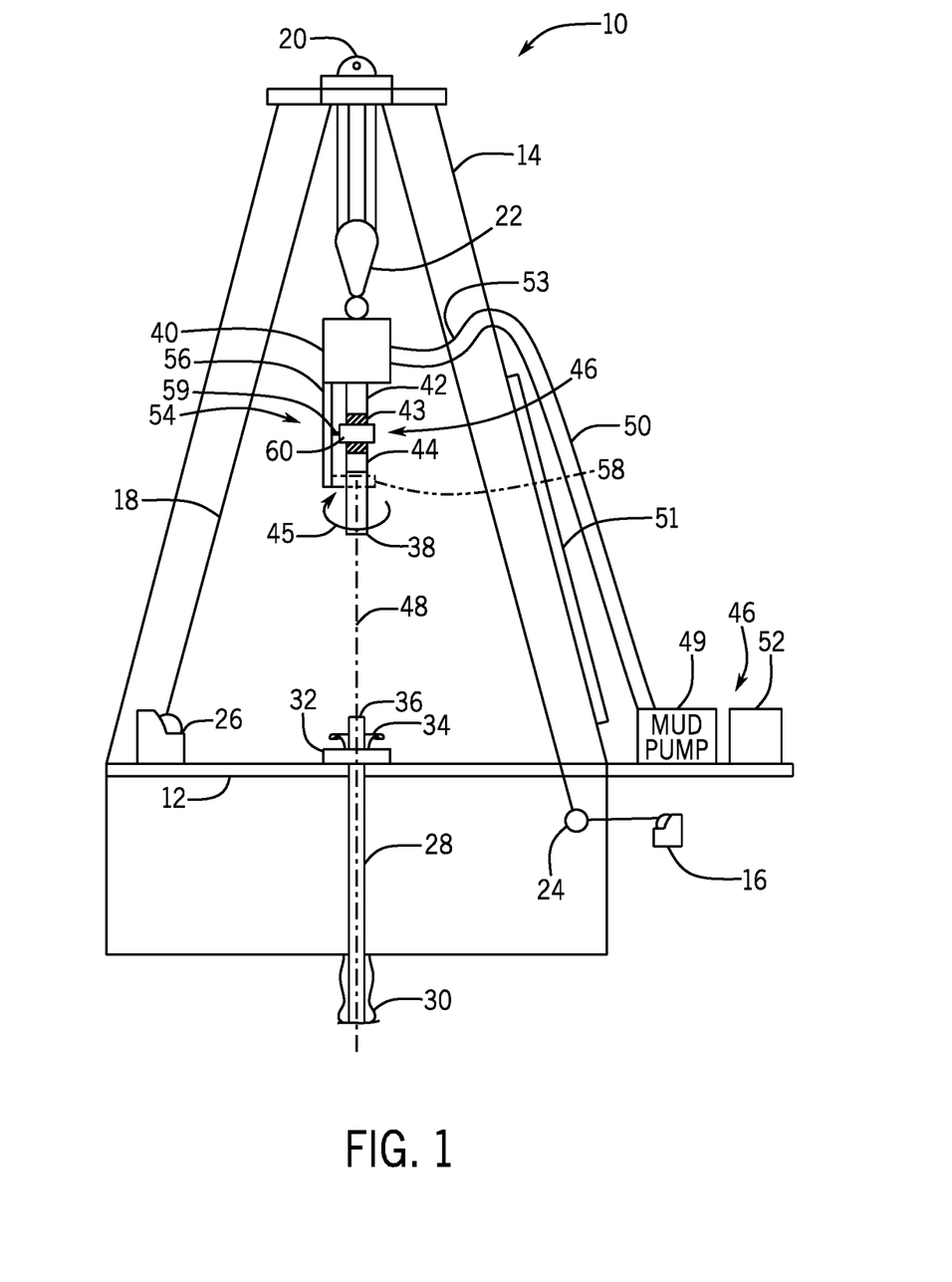
FIG. 1 is a schematic of a well being drilled, in accordance with present techniques.

Turning now to the drawings, FIG. 1 is a schematic of a drilling rig 10 in the process of drilling a well, in accordance with present techniques. The drilling rig 10 features an elevated rig floor 12 and a derrick 14 extending above the rig floor 12. A supply reel 16 supplies drilling line 18 to a crown block 20 and traveling block 22 configured to hoist various types of drilling equipment above the rig floor 12. The drilling line 18 is secured to a deadline tiedown anchor 24, and a drawworks 26 regulates the amount of drilling line 18 in use and, consequently, the height of the traveling block 22 at a given moment. Below the rig floor 12, a casing string 28 extends downward into a wellbore 30 and is held stationary with respect to the rig floor 12 by a rotary table 32 and slips 34. A portion of the casing string 28 extends above the rig floor 12, forming a stump 36 to which another length of tubular 38 (e.g., casing) may be added. In certain embodiments, the tubular 38 may include 30 foot segments of oilfield pipe having a suitable diameter (e.g., 13⅜ inches) that are joined as the casing string 28 is lowered into the wellbore 30. As will be appreciated, in other embodiments, the length and/or diameter of segments of the tubular 38 may be other lengths and/or diameters. The casing string 28 is configured to isolate and/or protect the wellbore 30 from the surrounding subterranean environment. For example, the casing string 28 may isolate the interior of the wellbore 30 from fresh water, salt water, or other minerals surrounding the wellbore 30.

When a new length of tubular 38 is added to the casing string 28, a top drive 40, hoisted by the traveling block 22, positions the tubular 38 above the wellbore 30 before coupling with the casing string 28. In the current embodiment, the top drive utilizes a grabber system 54 to hold the tubular 38 while the top drive 40 coupled to the tubular. However, in some embodiments, the top drive 40 may couple to the tubular 38 via a casing drive system (not shown). More specifically, in some embodiments, the top drive 40 may utilize the grabber system 54 to couple the top drive 40 to the casing drive system, which is in turn coupled to the tubular 38. The grabber system 54 may include a grabber leg 56 coupled to the top drive 40, a grabber box 58 coupled to the end of the grabber leg 56 and configured to grab the tubular 38 (e.g., or the casing drive system), and a mud saver valve support 59 configured to couple a mud saver valve housing 60 of a mud saver valve 43 to the grabber leg 56.

The top drive 40, once coupled with the tubular 38, may then lower the coupled tubular 38 toward the stump 36 such that the tubular 38 connects with the stump 36 and becomes part of the drill string 28. As the tubular 38 is lowered, the top drive 40 may rotate the tubular 38, as indicated by arrow 45. Specifically, the top drive 40 includes a quill 42, a mud saver valve 43, and a saver sub 44 (e.g., a crossover sub), used to turn the tubular 38. The tubular 38 may be coupled to the saver sub 44, which is coupled to the mud saver valve 43, which is in turn coupled to the top drive 40 via the quill 42. In certain embodiments, the mud saver valve 43 may include threads on both axial ends to couple to the saver sub 44 and the quill 42.

Further, the top drive 40 may include one or more integral seals or may be configured to couple with the tubular 38 about a seal such that a sealed passage is established between the top drive 40 and the tubular 38. Establishing this sealed passage facilitates circulation of fluid (e.g., drilling mud) through the top drive 40 into the tubular 38 and the casing string 28. Further, as discussed above, the top drive 40 couples with the tubular 38 in a manner that enables translation of motion to the tubular 38. Indeed, in the illustrated embodiment, the top drive 40 is configured to supply torque for making-up and unmaking a coupling between the tubular 38 and the stump 36.

To facilitate the circulation of mud or other drilling fluid within the wellbore 30, the drilling rig 10 includes a mud pump 49 configured to pump mud or drilling fluid up to the top drive 40 through a mud hose 50. In certain embodiments, the mud hose 50 may include a stand pipe 51 coupled to the derrick 14 in a substantially vertical orientation to facilitate pumping of mud. The stand pipe 51 provides a high-pressure path for mud to flow up the derrick 14 to the top drive 40. From the mud hose 50 (e.g., stand pipe 51), the mud flows through a kelly hose 53 to the top drive 40. From the top drive 40, the drilling mud will flow through internal passages of the mud saver valve 43, into internal passages of the tubular 38 and the casing string 28, and into the wellbore 30 to the bottom of the well. The drilling mud flows within the wellbore 30 (e.g., in an annulus between the casing string 28 and the wellbore 30) and back to the surface where the drilling mud may be recycled (e.g., filtered, cleaned, and pumped back up to the top drive 40 by the mud pump 49).

When a new length of tubular 38 is to be added to the casing string 28, mud flow from the mud pump 49 and the mud hose 50 is stopped, and the top drive 40 is removed from the casing string 28 (i.e., the length of tubular 38 most recently added to the casing string 28). When the top drive 40 releases the casing string 28, mud within the top drive 40 may run out of the top drive 40 and onto the rig floor 12. To avoid spilling mud onto the rig floor 12, the mud saver valve 43 is included to block mud from inadvertently flowing out of the top drive 40 when the mud pump 49 is not pumping mud. When the top drive 40 is thereafter coupled to a new length of tubular 38 and the mud pump 49 resumes a pumping operation, the mud saver valve 43 may enable flow of mud through the mud saver valve 43 and the top drive 40 to the tubular 38 and casing string 28.

Further, as mentioned above, the top drive 40 may become off balance and may move or sway from side to side (e.g., linearly), in an oblong motion, and/or a circular motion during drilling or running of the casing string 28 and the tubular 38. When the top drive 40 moves or sways, the tubular 38 hoisted and supported by the top drive 40 may not remain centered over the stump 36 and the wellbore 30. Therefore, it may be desirable to measure and monitor any deviation of the top drive 40, quill 42, mud saver valve 43, saver sub 44, and/or tubular 38 from a central axis 48 of the casing string 28 and stump 36 or other vertical axis. In other words, it may be desirable to measure and monitor movement (e.g., linear, lateral, radial, oblong, circular, and/or swirl movement) of the top drive 40, quill 42, saver sub 44, and/or tubular 38 outside of or relative to an axis (e.g., the central axis 48).

Accordingly, in the illustrated embodiment, the top drive 40 includes a mud saver valve measurement system 46 (e.g., top drive movement measurement system), which is configured to measure and monitor movement of the top drive 40, quill 42, mud saver valve 43, saver sub 44 (e.g., crossover sub), and/or tubular 38. In the illustrated embodiment, the mud saver valve measurement system 46 includes the mud saver valve 43, a mud saver valve housing 60, and a monitoring station 52. The mud saver valve housing 60 may be disposed about the mud saver valve 43 and is configured to actuate one or more valve elements of the mud saver valve 43 to control mud flow. As described in detail below, the mud saver valve housing 60 may be supported in part by the mud saver valve support 59 of the grabber system 54. As described in detail below, the mud saver valve housing 60 may include sensors, such as a linear accelerometer, a gyroscope, and/or other sensors configured to collect data indicative of linear and/or circular motion (e.g., swirl) of the top drive 40, the quill 42, the mud saver valve 43, the saver sub 44, and/or and the tubular 38. The mud saver valve housing 60 may also be communicatively coupled to strain gauges disposed on the mud saver valve 43. Additionally, the mud saver valve housing 60 may include one or more signal transmitters (e.g., an antennas) or other communications devices configured to communicate with a corresponding communications device of the monitoring station 52. Accordingly, the monitoring station 52 may receive and analyze data collected by the sensors of the mud saver valve housing 60. In certain embodiments, the monitoring station 52 may be configured to alert a user or operator when movement detected by the mud saver valve housing 60 exceeds a predetermined threshold.

The monitoring station 52 may also be configured to regulate operation of the mud pump 49 and/or other features of the drilling rig 10. For example, the monitoring station 52 may be configured to regulate a flow rate of mud or other drilling fluid circulated through the casing string 28 and the wellbore 30 during installation of tubular elements (e.g., casing 38). For example, the monitoring station 52 may regulate operation of the mud pump 49 to start, stop, increase, and/or decrease mud flow into the casing string 28 and wellbore 30 during installation of tubular 38 elements. The monitoring station 52 may also regulate other components of the drilling rig 10 to control flow of drilling mud. For example, the monitoring station 52 may control operation of the top drive 40 and/or a valve disposed along the mud hose 50.

It should be noted that the illustration of FIG. 1 is intentionally simplified to focus on the mud saver valve measurement system 46 described in detail below. Many other components and tools may be employed during the various periods of formation and preparation of the well. Similarly, as will be appreciated by those skilled in the art, the orientation and environment of the well may vary widely depending upon the location and situation of the formations of interest. For example, rather than a generally vertical bore, the well, in practice, may include one or more deviations, including angled and horizontal runs. Similarly, while shown as a surface (land-based) operation, the well may be formed in water of various depths, in which case the topside equipment may include an anchored or floating platform.

Figure 2:
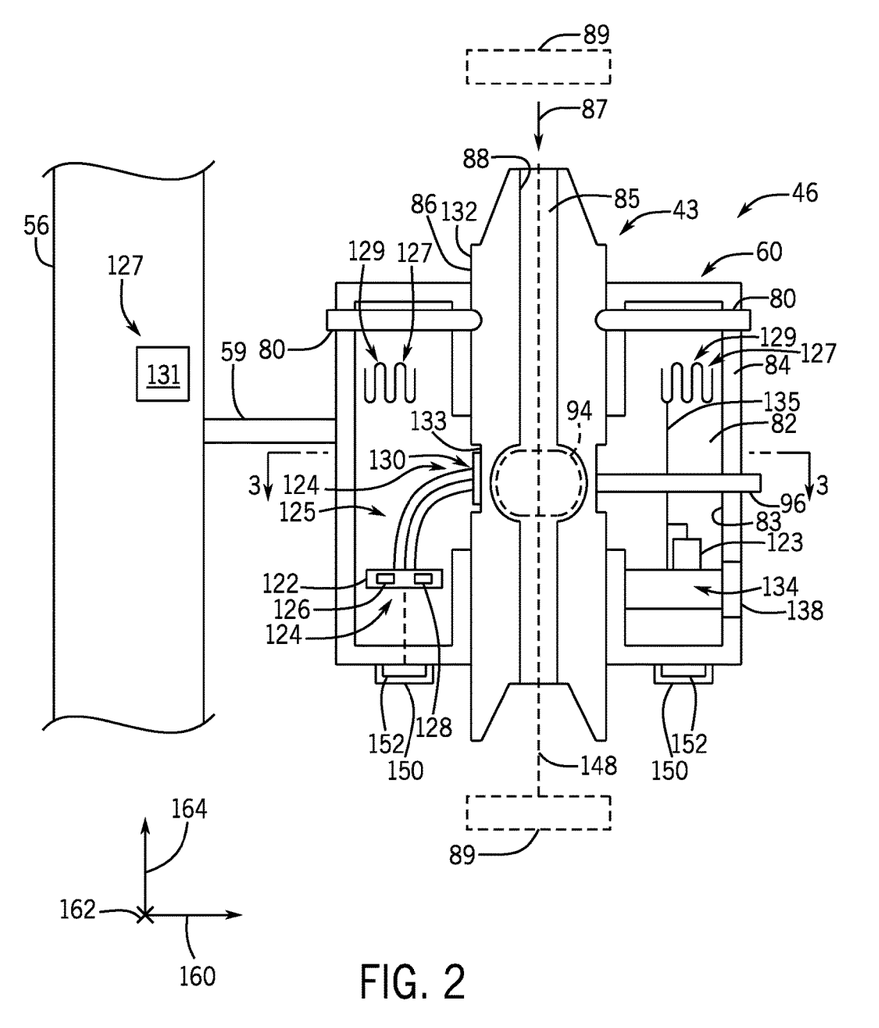
FIG. 2 is a schematic cross-sectional view of a mud saver valve and a mud saver valve housing having a mud saver valve measurement system, in accordance with the present techniques.

FIG. 2 is a cross-sectional schematic view of a portion of the grabber system 54 and a portion of the mud saver valve measurement system 46. More specifically, the FIG. 2 shows the grabber leg 56, the mud saver valve 43, and the mud saver valve housing 60. The mud saver valve housing 60 may be disposed about and coupled to the mud saver valve 43. In certain embodiments, the mud saver valve 43 may be coupled to the mud saver valve housing 60 via drop pins 80. Additionally, or in the alternative, the mud saver valve 43 may be coupled to the mud saver valve housing 60 via fasteners (e.g., bolts or screws), welding, brazing, a friction fit, and interference fit, or other coupling method. During drilling operations (e.g., drilling, adding tubular, etc.), the drill string (e.g., quill 42, mud saver valve 43, saver sub 44, tubular 38, and/or casing string 28) may rotate via application of torque by the top drive 40. Therefore, a rotational portion 82 of the mud saver valve housing 60 may rotate with the drill string (e.g., mud saver valve 43), and a stationary portion 84 of the mud saver valve housing 60 may be in a rotationally fixed position relative to the grabber leg 56. Therefore, the rotational portion 82 of the mud saver valve housing 60 may be rigidly coupled to an outer diameter 86 of the mud saver valve 43, and the stationary portion 84 may be rigidly coupled to the grabber leg 56 via the mud saver valve support 59. Accordingly, a sliding mechanism 83 (e.g., roller bearings, lubricant film, etc.) may be disposed between the rotational portion 82 and the stationary portion 84 of the mud saver valve housing 60. Particularly, the sliding mechanism may provide a means for the rotational portion 82 to move along the stationary portion 84 without creating excessive friction.

Furthermore, an inner diameter 88 of the mud saver valve may 43 define a central passage or a flow path 85 through which a flow of drilling mud or other fluid may flow from the top drive 40, through the mud saver valve 43, and into the tubular 38. When the top drive 40 is coupled to a length of tubular 38, the saver sub 44 (or in certain embodiments, a casing running tool) may be inserted axially into (e.g., "stabbed" into) the tubular 38. In this manner, drilling mud may flow from the top drive 40, through the mud saver valve 43, as indicated by arrow 87, and into the tubular 38 when the mud pump 49 is pumping. As will be appreciated, the drill string and/or the top drive 40 may include seals 89 (e.g., O-rings, axial seals, annular seals, etc.), gaskets, and/or other components configured to enable a flow of mud or other fluid through the top drive 40, the drill string 28, and the tubular 38.

To control the flow of mud through the flow path 85, the mud saver valve 43 may include one or more ball valves 94 that may be actuated via one or more valve controls 96 of the mud saver valve housing 60. More particularly, the valve control 96 may actuate (e.g., rotate) the one or more ball valves 94 to allow a flow of drilling mud or other fluid through the flow path 85. In some embodiments, the valve control 96 may be controlled by the monitoring station 52 to control mud flow as described above. In some embodiments, the mud saver valve 43 may utilize any suitable form of valve to control mud flow through the flow path 85.

Further, the mud saver valve housing 60 encases various internal components of the mud saver valve measurement system 46. For example, in the illustrated embodiment, the mud saver valve housing 60 may include a printed circuit board 122 and various sensors 124. In some embodiments, sensors 124 may be positioned on the printed circuit board 122. Specifically, the mud saver valve measurement system 46 may include a linear accelerometer 126 and a gyroscope 128. In other embodiments, additional sensors 124 may be included as part of the mud saver valve measurement system 46, such as additional accelerometers, gyroscopes, magnetometers, compasses (e.g., a digital compass) or other types of sensors. As will be appreciated, the linear accelerometer 126 and the gyroscope 128 may be configured to measure acceleration, rotation, angular velocity, vibration, inertia, or other parameters indicative of movement.

For example, during rotation of the mud saver valve 43 (e.g., during running of the drill string 28 and/or the tubular 38), the linear accelerometer 126 may experience and detect constant forces in along an X-axis 160 and a Y-axis 162 of the mud saver valve 43. However, if the mud saver valve 43 is experiencing a swirl motion (e.g., oblong motion about a Z-axis 164 of the mud saver valve 43), the linear accelerometer 126 may detect increases and/or decrease in the forces acting along the X-axis 160 and Y-axis 162. Similarly, the gyroscope 128 may detect non-constant forces along the X-axis 160 and Y-axis 162 during swirl movement of the mud saver valve 43. The measurements obtained by the linear accelerometer 126 and the gyroscope 128 may be transmitted to the monitoring station 52 of the mud saver valve measurement system 46 for analysis and monitoring. In certain embodiments, the monitoring station 52 may be configured to generate and display graphs using the measurements obtained by the linear accelerometer 126 and the gyroscope 128. In this manner, the measurements obtained by the sensors 124, and therefore swirl movement of the mud saver valve 43, may be monitored by an operator or user. Examples of such graphs are discussed below with respect to FIGS. 5 and 6. Further, in some embodiments, the sensors 124 may measure a number of rotations (e.g., turns) of the tubular 38 (e.g., via measurement of the mud saver valve 43) during drilling operations such as adding tubular 38 to the casing string 28 (e.g., casing running).

Furthermore, the illustrated embodiment of the mud saver valve housing 60 and mud saver valve 43 includes strain gauges 130 disposed on an outer circumference 132 of the mud saver valve 43. In particular, a plurality of strain gauges 130 is positioned circumferentially (e.g., equidistantly or substantially equidistantly) about the outside circumference 132 of the mud saver valve 43. In some embodiments, the strain gauges 130 may be disposed on a narrowed section 133 of the outer circumference 132 of the mud saver valve 43. For example, 1, 2, 3, 4, 5, 6, 7, 8, 9, 10, or more strain gauges 130 may be positioned (e.g., circumferentially) on the outer circumference 132 of the mud saver valve 43. In other embodiments, the strain gauges 130 may be spaced or arranged in other configurations. The strain gauges 130 may further be operatively coupled to the printed circuit board 122. As will be appreciated, the strain gauges 130 are configured to measure strain (e.g., tension and compression forces) acting on the mud saver valve 43. For example, the strain gauges 130 may be flexible, adhesive sensors that include a metallic foil pattern configured to deform and change in electrical resistance when a force tension or compression force is applied to the surface of the mud saver valve 43. During movement (e.g., linear, oblong, or swirl movement) of the mud saver valve 43, one or more of the strain gauges 130 may detect strain (e.g., compression or tension) acting on one or more surfaces of the mud saver valve 43. The measurements obtained by the strain gauges 130 are described in further detail below. As with the measurements of the linear accelerometer 126 and the gyroscope 128, the measurements obtained by the strain gauges 130 may also be transmitted to the monitoring station 52 for analysis and monitoring.

As mentioned above, the mud saver valve housing 60 may be coupled to the mud saver valve 43 (and the drill string 28) via the drop pins 80. Further, the strain gauges 130 may be communicatively coupled to the printed circuit board 122 via cables 125. In some embodiments, the strain gauges 130 may be communicatively coupled to a different printed circuit board 122 than the printed circuit board 122 to which the linear accelerometer 126 and the gyroscope 128 are coupled to. For example, in some embodiments, there may be a corresponding and separate printed circuit board 122 for each strain gauge 130. Indeed, there may be 1, 2, 3, 4, 5, 6, 7, 8, 9, 10, or more printed circuit boards 122 be positioned (e.g., circumferentially) within the mud saver valve housing 60 (e.g., within the rotational portion 82 of the mud saver valve housing 60). Further, as mentioned above, the strain gauges 130 may be communicatively coupled to respective printed circuit boards 122 via one or more cables 125 (e.g., wires, breakaway cables). In some instances (e.g., a kick-back event), it may be beneficial to quickly disengage the drill string 28 (e.g., the quill 42, the mud saver valve 43, the saver sub 44, the tubular 38, and/or the casing string 28) from the top drive 40. In such instances, the drop pins 80 may be withdrawn from the mud saver valve 43, thereby decoupling the mud saver valve housing 60 from the mud saver valve 43. Disengagement of the pins 80 from the mud saver valve 43 may be actuated by a disengagement signal from the monitoring station 52, which may be sent in response to operator input and/or if the monitoring stations 52 determines that the top drive 40 and/or drill string 28 is experiencing strain and/or movement beyond a specified threshold. For example, the monitoring station 52 may receive information from the sensors 124 regarding forces and/or movement of the top drive 40 and/or mud saver valve 43, analyze the information, and determine if the top drive 40 and/or mud saver valve 43 is experiencing movement and/or strain beyond a predetermined threshold of movement and/or strain. In some embodiments, the pins 80 may be disengaged from the mud saver valve 43 due to reactive springs that may automatically withdraw the pins 80 in such instances (e.g., kickback event). In some embodiments, the pins 80 may be manually withdrawn from the mud saver valve 43 with operator input. With the drop pins 80 disengaged (e.g., withdrawn) from the mud saver valve 43, the mud saver valve 43 (along with the drill string 28) may drop from the top drive 40. In this manner, the strain gauges 130 may also drop along with the mud saver valve 43.

Accordingly, the cables 125 may be suited to easily disengage (e.g., decouple, break-away) from the strain gauges 130. For example, before the mud saver valve 43 drops, the cables 125 may be coupled within sheaths (e.g., conductive sheaths) of the strain gauges 130. In some embodiments, before the mud saver valve 43 drops, the cables 125 may be coupled with an epoxy and/or solder to the strain gauges 130, or any other suitable coupling that may decouple with a small amount of force. More particularly, the cables 125 may be coupled to the strain gauges 130 via a coupling (e.g., sheaths, epoxy, solder, etc.) to provide a low-force disengagement for the strain gauges 130 and the cables 125 when the mud saver valve 43 drops with the drill string 28. Indeed, the printed circuit board 122 and other components of the mud saver valve housing 60 may not receive a significant amount of force as a result of the mud saver valve 43 dropping and the cables 125 disengaging from the strain gauges 130. As mentioned above, the mud saver valve housing 60 may be at least partially supported by the mud saver valve support 59 of the grabber system 54. As such, in the event that the mud saver valve 43 is dropped, the mud saver valve housing 60 may remain in place and supported via the mud saver valve support 59.

The mud saver valve housing 60 may house other components as well. For example, in the illustrated embodiment, the mud saver valve housing 60 houses a battery 134 within a recess of the rotational portion 82 of the mud saver valve housing 60. As shown, the battery 134 may be covered by a battery cover 138 configured to seal the battery 134 from the environment surrounding the mud saver valve housing 60. As will be appreciated, the battery cover 138 may be removable to enable access to the battery 134 (e.g., for replacement) without removing the mud saver valve housing 60 from the mud saver valve 43 and/or disassembling other components of the mud saver valve housing 60. The battery 134 is configured to supply power to one or more components of the mud saver valve housing 60, such as the printed circuit board 122, the linear accelerometer 126, the gyroscope 128, the strain gauges 130, communications components configured to transmit measured data to the monitoring station 52, and/or other components.

The battery 134 may be charged by a generator 127 of the top drive 40. The generator 127 may include coils 129 (e.g., rotor) disposed within the rotational portion 82 of the mud saver valve housing 60, and magnets 131 (e.g., stator) disposed within and/or on a surface of the grabber leg 56 of the grabber system 54. In some embodiments, the magnets 131 may be disposed on the stationary portion 84 of the mud saver valve housing 60. The coils 129 may be formed from any suitable conductive wiring (e.g., copper, aluminum, etc.) used in general generator applications, and the magnets 131 may be any suitable magnet (e.g., permanent magnets, temporary magnets, electromagnets, etc.) that may be used in general generator applications. During some drilling operations, the rotational portion 82 of the mud saver valve housing 60 may rotate relative to the grabber leg 56. In this manner, the coils 129 may pass through the magnetic field of the magnets 131, thereby inducing a voltage within the coils 129. The voltage produced by the coils 129 and magnets 131 may be used to power the battery 134. Specifically, the coils 129 may be communicatively coupled to the battery 134 via an electronic coupling 135 (e.g., wire, transmitter, etc.) which may provide a means for the voltage produced by the coils 129 and magnets 131 to be routed to the battery 134. Therefore power produced from the generator 127 may be stored in the battery 134. In some embodiments, the generator 127 may produce an alternating current (AC) power supply, which may be transformed into a direct current (DC) power supply via a rectifier 123 before being stored in the battery 134.

Furthermore, it should be noted that the generator 127 may be located at any suitable location within the drilling rig 10. Particularly, the coils 129 may be disposed on and/or within any portion of the drilling rig 10 that is configured to rotate. For example, the coils 129 may be disposed on and/or within a component of the top drive 40, the drill string 28, the quill 42, the mud saver valve 43, the saver sub 44, other rotatable portions of the drilling rig 10, or any combination thereof. Similarly, the magnets 131 may be disposed on any component of the drilling rig 10 that is adjacent to the location of the coils 129, such that the coils 129 may move through the magnetic field of the magnets 131, thereby inducing a voltage.

As mentioned above, the mud saver valve 43 may include communications components configured to transmit data measured by the sensors 124 (e.g., linear accelerometer 126, gyroscope 128, and/or strain gauges 130) to the monitoring station 52. For example, in the illustrated embodiment, the mud saver valve housing 60 includes antenna covers 150 configured to house antennas 152 (e.g., signal transmitters) of the mud saver valve housing 60. In certain embodiments, the antennas 152 may be configured to transmit data (e.g., measurement data from the sensors 124) as radio signals to a signal receiver of the monitoring station 52. Accordingly, the sensors 124 and/or the printed circuit board 122 may be communicatively coupled to the antennas 152 via a data transmitter 153 (e.g., wire, wireless receiver/transmitter, etc.), which may transmit the data from the sensors 124 to the antennas 152.

Further, it should be noted that the location of the mud saver valve measurement system (e.g., including the sensors 124, the battery 134, the generator 127, the antennas 152, etc.) within the mud saver valve housing 60 may reduce the overall height (e.g., stack-up height) of the top drive 40 and/or the drill string 28. For example, traditional measurement systems may include a separate sub to be added to the top drive 40 in order to measure parameters of the top drive 40. Such separate subs may take valuable space along the drill string 28 and/or within the top drive 40. Accordingly, the current embodiments discussed herein may provide for a shorter top drive 40 and/or drill string 28, relative to top drives with traditional measurement systems.

Figure 3:
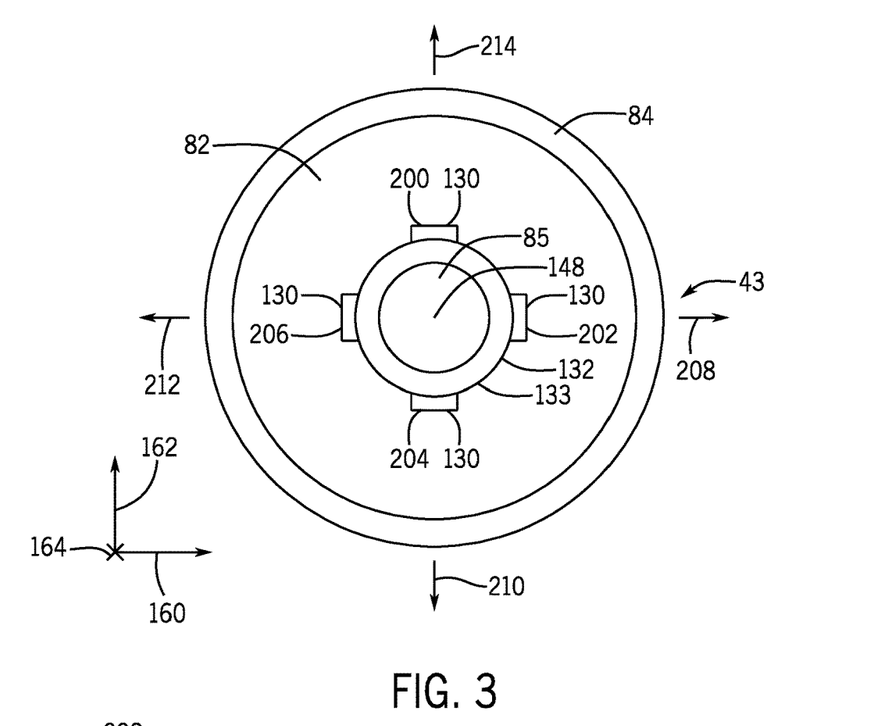
FIG. 3 is a schematic cross-sectional axial view of the mud saver valve and mud saver valve housing having the mud saver valve measurement system, in accordance with present techniques.

FIG. 3 is a cross-sectional top view of the mud saver valve housing 60 and the mud saver valve 43, taken along line 3-3 of FIG. 3, illustrating an arrangement of strain gauges 130 about the outer circumference 132 of the mud saver valve 43. Specifically, the illustrated embodiment includes four strain gauges 130 (e.g., a first strain gauge 200, a second strain gauge 202, a third strain gauge 204, and a fourth strain gauge 206) disposed about the narrowed section 133 of the mud saver valve 43 approximately ninety degrees from one another. However, in other embodiments, the mud saver valve 43 may have other numbers of strain gauges 130 positioned on the outer circumference 132 (e.g., narrowed section 133 of the outer circumference 132). Additionally, in certain embodiments, more than one strain gauge 130 may be positioned at a particular location about the outer circumference 132 of the mud saver valve 43. As mentioned above, the strain gauges 130 are configured to measure strain (e.g., tension and compression forces) acting on the surface of the mud saver valve 43. In particular, the strain gauges 130 may measure a moving bending moment acting on the mud saver valve 43. Further, as mentioned above, the strain gauges 130 may be disposed about the narrowed section 133 of the outer circumference 132. Indeed, the narrowed section 133 may deform more in response to forces (e.g., compression, tension, shear, torsion, etc.) on the mud saver valve 43 than other sections of the outer circumference 132 of the mud saver valve 43. Therefore, the placement of the strain gauges 130 on the narrowed section 133 may increase the sensitivity and accurateness of the strain gauges 130 and the mud saver valve measurement system 46 when measuring forces and/or movement on the mud saver valve 43.

During a swirl motion of the mud saver valve 43 (e.g., circular movement about the Z-axis 164 of the mud saver valve 43) one or two strain gauges 130 may detect a compression force on the outer circumference 132 of the mud saver valve 43 and one or two strain gauges 130 may detect a tension force on the outer circumference 132 of the mud saver valve 43. The following discussion describes measurements of the strain gauges 130 in the illustrated embodiment during clockwise circular swirl of the mud saver valve 43. For example, if the mud saver valve 43 is bending or moving in a direction 208 (and therefore bowing in a direction opposite direction 208) during clockwise circular swirl movement, the second strain gauge 202 may detect a compressive force, and the fourth strain gauge 206 may detect a tension force. Thereafter, as the mud saver valve 43 continues to swirl clockwise, the mud saver valve 43 will bend in a direction 210. When the mud saver valve 43 bends in the direction 210, the third strain gauge 204 will detect a compressive force, and the first strain gauge 200 will detect a tension force. As the mud saver valve 43 continues to swirl clockwise, the mud saver valve 43 will bend in a direction 212. When the mud saver valve 43 bends in the direction 212, the fourth strain gauge 206 will detect a compressive force, and the second strain gauge 202 will detect a tension force. Lastly, when the mud saver valve 43 bends in the direction 214, the first strain gauge 200 will detect a compressive force, and the third strain gauge 204 will detect a tension force. In other words, when the mud saver valve 43 is bending in a particular direction during a swirl movement, at least one strain gauge 130 will experience a compressive force, and another strain gauge on the opposite side of the mud saver valve 43 will experience a tension force.

As will be appreciated, at certain positions of the mud saver valve 43 during the clockwise, circular swirl movement, two strain gauges 130 may detect a compression force on the outer circumference 132 and two strain gauges 130 may detect a tension force. For example, as the mud saver valve 43 swirls from bending in the direction 208 to the direction 210, the second and third strain gauges 202 and 204 may detect a compressive force and the first and fourth strain gauges 200 and 206 may experience a tension force. As similarly described above, the monitoring station 52 may be configured to generate and display graphs using the measurements obtained by strain gauges 130. In this manner, the measurements obtained by the sensors 124, and therefore swirl movement of the mud saver valve 43, may be monitored by an operator or user. Examples of such graphs are described below with respect to FIGS. 5 and 6.

Figure 4:
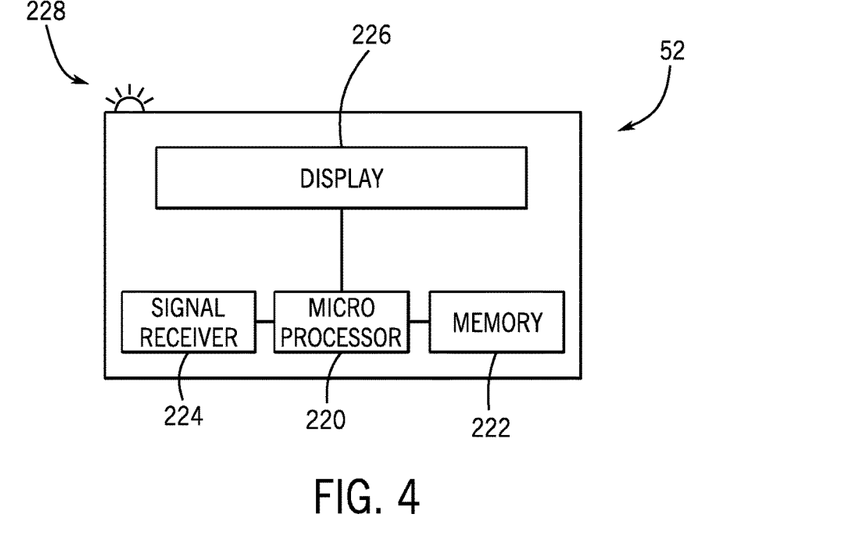
FIG. 4 is a schematic of a monitoring station of the mud saver valve measurement system, in accordance with present techniques.

FIG. 4 is a schematic representation of the monitoring station 52 of the mud saver valve measurement system 46. The monitoring station 52 includes one or more microprocessors 220, a memory 222, a signal receiver 224, and a display 226 (e.g., an LCD). The memory 222 is a non-transitory (not merely a signal), computer-readable media, which may include executable instructions that may be executed by the microprocessor 220. Additionally, the memory 222 may be configured to store data collected by the mud saver valve measurement system 46. For example, the signal receiver 224 may receive data measurements from the mud saver valve housing 60. These data measurements may include measurements detected by the linear accelerometer 126, the gyroscope 128, the strain gauges 130, and/or other data. Using the collected data, the microprocessor 220 may generate a graphical output of the forces measured by the linear accelerometer 126, the gyroscope 128, and/or the strain gauges 130. The graphical output may then be displayed on the display 226 for viewing and monitoring by an operator or user. In other embodiments, the microprocessor 220 may generate a different or additional output. For example, the output of the microprocessor 220 may be a normalized displacement value (e.g., a number) that represents an amount of lateral movement, swirl, or other movement of the mud saver valve housing 60, and thus, the mud saver valve 43. In such embodiments, the normalized displacement value may be numerically displayed on the display 226, may be represented graphically (e.g., by a bar graph), or may be displayed by the display 226 in another suitable manner.

In certain embodiments, threshold measurement values (e.g., forces detected by the sensors 124, normalized displacement threshold value, etc.) may be stored in the memory 222. For example, the threshold measurement values may correlate to an amount or level of movement (e.g., swirl, oblong, radial, or lateral movement) for which an operator may wish to power down the top drive 40. If the measured values meet or exceed the threshold values, an alarm 228, such as an auditory and/or visual alarm, of monitoring station 52 may be activated to alert a user or operator that the swirl movement has exceeded the threshold. In some embodiments, the monitoring station 52 may automatically assert control and make adjustments (e.g., slow or shutdown operation of the top drive 40) when certain measurement values are observed. As mentioned above, the monitoring station 52 may receive information regarding a number of rotations (e.g., turns) of the mud saver valve 43 during drilling operations (e.g., casing running). The monitoring station 52 may analyze this information and determine when a new casing element (e.g., tubular 38) has been thoroughly or sufficiently coupled to the stump 36 of the casing string 28. If the monitoring station 52 has determined that the new casing element has been thoroughly or sufficiently coupled to the stump 36 of the casing string 28, the monitoring station 52 may send a signal to the top drive 40 to stop rotating the new casing element. In some embodiments, the monitoring station 52 may display a message indicating that the new casing element has been coupled to the casing string 28. Further, as mentioned above, the monitoring station 52 may control mud flow through the top drive 40 via the mud saver valve 43.

Figure 5:
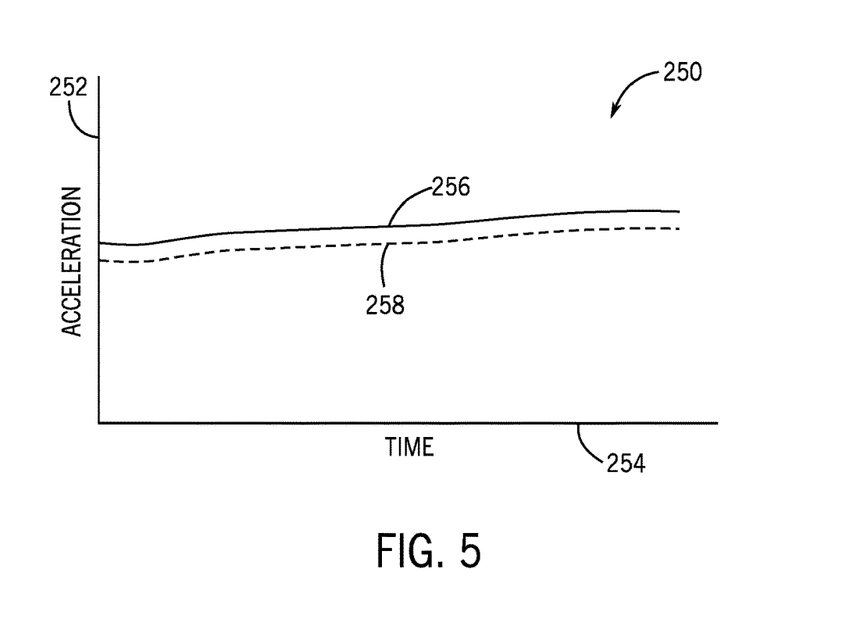
FIG. 5 is a graph illustrating linear acceleration measurements of an accelerometer of the mud saver valve measurement system versus time, in accordance with present techniques.
Figure 6:
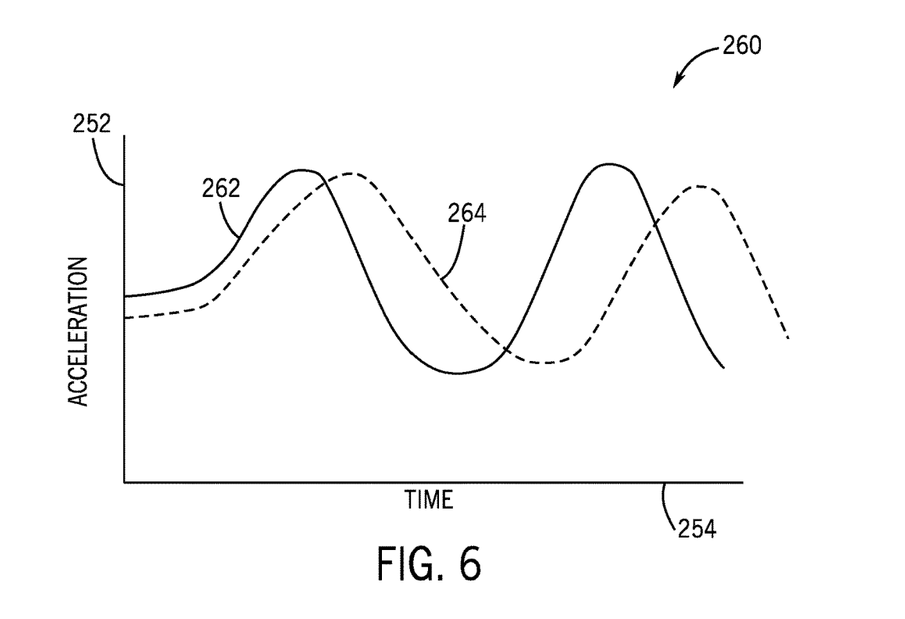
FIG. 6 is a graph illustrating linear acceleration measurements of an accelerometer of the mud saver valve measurement system versus time, in accordance with present techniques.

FIGS. 5-8 illustrate embodiments of graphs that may be generated and/or displayed by the monitoring station 52. For example, FIGS. 5 and 6 are graphs illustrating data that may be collected by the linear accelerometer 126. In FIG. 5, a graph 250 illustrates acceleration 252 data with respect to time 254. In particular, a first line 256 may represent acceleration 252 or force measured by the linear accelerometer 126 along the X-axis 160, and a second line 258 may represent acceleration 252 or force measured by the accelerometer 126 along the Y-axis 162. As shown in the graph 250, the accelerations 252 along the X-axis 160 and Y-axis 162 remain essentially constant. For example, the accelerations 252 may be approximately zero. However, as will be appreciated, the measured accelerations 252 may not be exactly constant as the linear accelerometer 126 may also detect variances (e.g., minor variances) in acceleration 252. Nevertheless, when the accelerations 252 measured by the linear accelerometer 126 are constant or substantially constant, the mud saver valve 43 may not be experiencing swirl, or swirl experienced by the mud saver valve 43 may be completely centralized and circular.

In FIG. 6, a graph 260 also illustrates acceleration 252 data with respect to time 254. In the illustrated embodiment, the data depicted by the graph 260 indicated that the mud saver valve 43 may be experiencing an oblong or swirl movement. That is, the linear forces detected by the liner accelerometer 126 along the X-axis 160 and Y-axis 162 vary. For example, a first line 262 may represent acceleration 252 or force measured by the linear accelerometer 126 along the X-axis 160, and a second line 264 may represent acceleration 252 or force measured by the accelerometer 126 along the Y-axis 162. As shown, the lines 262 and 264 have peaks and troughs, indicating that the mud saver valve 43 is experiencing swirl movement (e.g., oblong or swirl movement). As will be appreciated, a graph illustrating data measured by the gyroscope 128 during swirl movement of the mud saver valve 43 may be similar to the data illustrated in graph 260.

Figure 7:
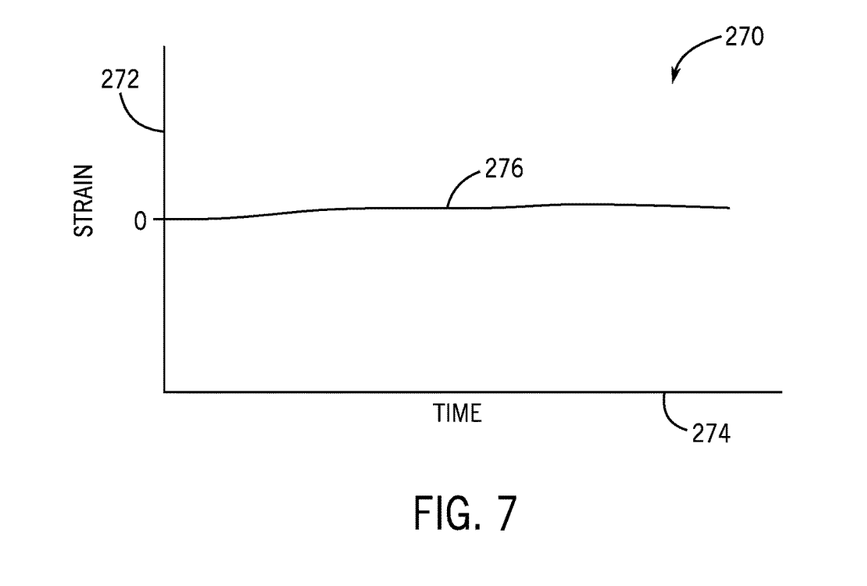
FIG. 7 is a graph illustrating measurements of strain gauges of the mud saver valve measurement system versus time, in accordance with present techniques.
Figure 8:
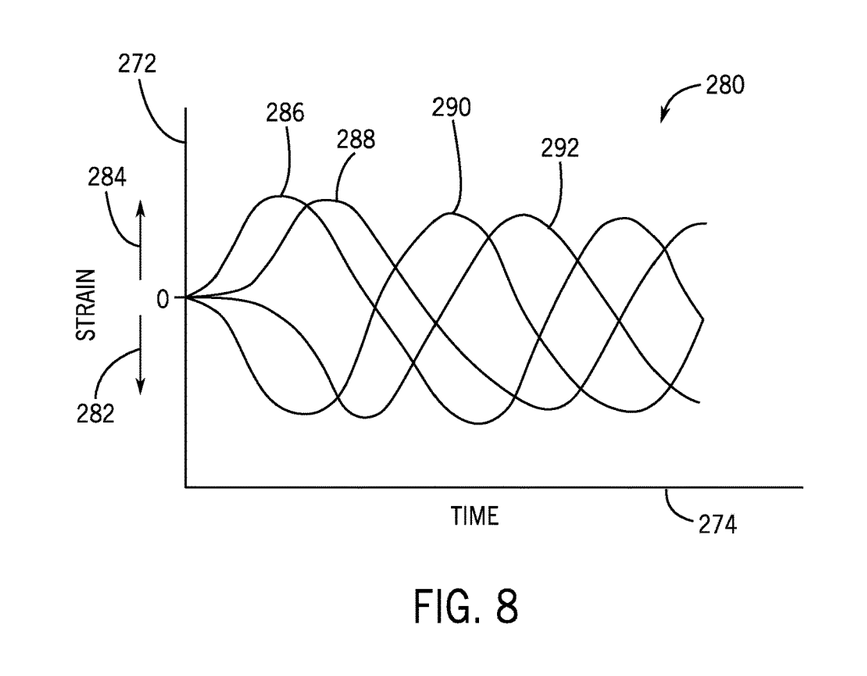
FIG. 8 is a graph illustrating measurements of strain gauges of the mud saver valve measurement system versus time, in accordance with present techniques.

FIGS. 7 and 8 are graphs illustrating data that may be collected by the strain gauges 130. For example, FIG. 7 shows a graph 270 displaying data measured by the strain gauges 130 when the mud saver valve 43 is not experiencing swirl movement. Specifically, the graph 270 plots strain 272 (e.g., compressive or tension force) measurements of the strain gauges 130 with respect to time 274. As will be appreciated, when the mud saver valve 43 is rotating during running of the tubular 38 but not experiencing swirl movement about the longitudinal axis 148 of the mud saver valve 43, the mud saver valve 43 may not experience any bending (e.g., compressive or tension forces). As such, a line 276 in graph 270 shows that none of the strain gauges 130 are detecting any compressive or tension forces.

FIG. 8 shows a graph 280 displaying data measured by the strain gauges 130 when the mud saver valve 43 is experiencing swirl movement (e.g., circular swirl movement) about the longitudinal axis 148 of the mud saver valve 43. As similarly described above with respect to FIG. 7, the graph 280 plots strain 272 with respect to time 274. The strain 272 measured by the strain gauges 130 may be compressive forces 282 or tension forces 284. In the illustrated embodiment, the graph 280 shows data collected by the strain gauges 130 when the mud saver valve 43 is experiencing circular, swirl movement.

As described above, during swirl movement of the mud saver valve 43, one or two strain gauges 130 may detect a compression force on the outer circumference 132 of the mud saver valve 43 and one or two strain gauges 130 may detect a tension force on the outer circumference 132 of the mud saver valve 43. For example, line 286 in graph 280 may represent data collected from the first strain gauge 200 shown in FIG. 3, line 288 may represent data collected from the second strain gauge 202 shown in FIG. 3, line 290 may represent data collected from the third strain gauge 204 shown in FIG. 3, and line 292 may represent data collected from the fourth strain gauge 206 shown in FIG. 3. As described in detail above, during swirl movement of the mud saver valve 43, when the first strain gauge 200 detects tension force 284 on the mud saver valve 43, the third strain gauge 204 detects compressive force 282 on the mud saver valve 43 (e.g., when the mud saver valve 43 is bending in the direction 210). As the mud saver valve 43 continues to swirl about the longitudinal axis 148 (e.g., in a clockwise direction), the mud saver valve 43 bends in the direction 212, thereby causing the second strain gauge 202 to detect tension force 284 and the fourth strain gauge 206 to detect compressive force 282, and so forth.

As discussed in detail above, present embodiments provide the mud saver valve measurement system 46 for the top drive system 40. As discussed above, during a drilling or tubular 38 (e.g., casing) running operation, the top drive system 40 rotates the tubular 38 while the tubular 38 (and drill string 28) is lowered into the wellbore 30. To improve monitoring and performance of top drive 40 operations, the drilling rig 10 may include the mud saver valve measurement system 46, which is configured to measure and monitor linear and/or circular motion (e.g., swirl) of the top drive 40 and the tubular 38 supported by the top drive 40 during the drilling or tubular 38 running operation. For example, the mud saver valve measurement system 46 may include the mud saver valve housing 60 having the linear accelerometer 126, the gyroscope 128, the strain gauges 130, or any combination thereof, configured to collect data indicative of linear and/or circular motion (e.g., swirl) of the top drive 40 and the tubular 38 about a longitudinal axis (e.g., longitudinal axis 148). The embodiments discussed above describe the mud saver valve housing 60 coupled to the mud saver valve 43 of the top drive system 30. However, in other embodiments, the mud saver valve housing 60 may be coupled to or integral with another component of the top drive system 40 or drilling rig 10. Furthermore, while the above embodiments of the mud saver valve housing 60 are described as including the linear accelerometer 126, the gyroscope 128, and the strain gauges 130, other embodiments of the mud saver valve housing 60 may include the linear accelerometer 126, the gyroscope 128, or the strain gauges 130 alone or in any other combination. The mud saver valve measurement system 46 may also include the monitoring station 52 configured to analyze the collected data, display the collected data, and/or alert a user or operator if the linear and/or circular motion (e.g., swirl) of the top drive 40 and the tubular 38 exceeds a threshold.

While only certain features of the present disclosure have been illustrated and described herein, many modifications and changes will occur to those skilled in the art. It is, therefore, to be understood that the appended claims are intended to cover all such modifications and changes as fall within the true spirit of the disclosure.

The invention claimed is:

1. A system, comprising:
   a top drive; and
   a top drive movement measurement system, comprising:

a mud saver valve configured to flow drilling fluid through a flow path of the mud saver valve, wherein the mud saver valve comprises a valve configured to control the flow of the drilling fluid through the flow path, and wherein the mud saver valve is configured to rotate via input of the top drive;

a mud saver valve housing configured to cover at least a portion of the mud saver valve;

a first plurality of sensors disposed within the mud saver valve housing, wherein the first plurality of sensors is configured to detect lateral movement of a component of the top drive;

a second plurality of sensors disposed within the mud saver valve housing, wherein the second plurality of sensors is configured to detect one or more compression or tension forces on the mud saver valve of the top drive a grabber leg coupled to the top drive;

a grabber box coupled to the grabber leg; and a mud saver valve support disposed between the grabber box and the top drive, and coupling the grabber leg to a stationary portion of the mud saver valve housing, wherein a rotational portion of the mud saver valve housing is configured to rotate with the mud saver valve.

2. The system of claim 1, wherein the first plurality of sensors comprises a linear accelerometer and a gyroscope, and wherein the second plurality of sensors comprises a plurality of strain gauges.

3. The system of claim 2, wherein the plurality of strain gauges is coupled to an outer circumference of the mud saver valve, and the plurality of strain gauges is spaced equidistantly about the outer circumference of the mud saver valve.

4. The system of claim 3, wherein the plurality of strain gauges is coupled to a narrowed section of the outer circumference of the mud saver valve.

5. The system of claim 1, wherein the first plurality of sensors is coupled to a printed circuit board disposed in the mud saver valve housing, and wherein the mud saver valve housing comprises a battery, wherein the battery is configured to supply power to the first plurality of sensors, the second plurality of sensors, the printed circuit board, or any combination thereof.

6. The system of claim 5,
wherein the top drive movement measurement system comprises a generator.

7. The system of claim 6, wherein the generator comprises:
one or more coils disposed within the rotational portion of the mud saver valve housing; and
one or more magnets disposed adjacent to the rotational portion of the mud saver valve housing, wherein the one or more coils is configured to interact with the one or more magnets to produce power during rotation of the mud saver valve, and wherein the power is routed to and stored within the battery.

8. The system of claim 6, wherein the mud saver valve housing is coupled to the mud saver valve via drop pins, the drop pins are configured to decouple the mud saver valve housing from the mud saver valve, and the mud saver valve is configured to decouple from the mud saver valve housing.

9. The system of claim 1, wherein the mud saver valve housing comprises an antenna, wherein the antenna is configured to transmit data collected by the first plurality of sensors, the second plurality of sensors, or both to a monitoring system of the top drive movement measurement system.

10. The system of claim 9, wherein the monitoring system comprises:
a signal receiver configured to receive the data from the antenna;
a processor; and
one or more non-transitory, computer-readable media having executable instructions stored thereon, the executable instructions comprising instructions that generate at least one output value representing the data.

11. The system of claim 10, wherein the executable instructions comprise instructions that actuate an alert of the monitoring system when the first plurality of sensors detects the lateral movement of the component of the top drive that exceeds a first threshold, the second plurality of sensors detects the compression or the tension forces on the mud saver valve that exceeds a second threshold, or both, wherein the one or more non-transitory, computer-readable media comprises at least one value stored thereon, wherein the at least one value corresponds to the first threshold, the second threshold, or both.

12. A method, comprising:
detecting a first parameter indicative of movement of a top drive system with respect to a rotational axis of the top drive system with a first plurality of sensors;
detecting a second parameter indicative of movement of the top drive system with respect to a longitudinal axis of the top drive system with a second plurality of sensors, wherein the first parameter is different from the second parameter;
transmitting the first parameter and the second parameter to a monitoring system;
comparing the first parameter to a first threshold value and comparing the second parameter to a second threshold value with the monitoring system,
wherein detecting the first parameter and the second parameter comprises detecting movement of a mud saver valve configured to flow mud through a sealed passage, wherein the first plurality of sensors and the second plurality of sensors are coupled to a rotational portion of a mud saver valve housing of the mud saver valve;
coupling a grabber leg to a top drive of the top drive system;
rotationally fixing a stationary portion of the mud saver valve housing to the grabber leg;
disposing one or more coils in the rotational portion of the mud saver valve housing;
disposing one or more magnets in the grabber leg, which is rotationally fixed to a stationary portion of the mud saver valve housing; and
generating power through interaction of the one or more coils with the one or more magnets when the rotational portion is rotating relative to the stationary portion.

13. The method of claim 12, wherein detecting the first parameter indicative of movement of the top drive system with respect to the rotational axis of the top drive system with the first plurality of sensors comprises detecting a first linear force in a first lateral direction and detecting a second linear force in a second lateral direction, wherein the first lateral direction is perpendicular to the second lateral direction.

14. The method of claim 13, wherein detecting the first linear force in the first lateral direction and detecting the second linear force in the second lateral direction comprises detecting the first and second linear forces with a linear accelerometer or a gyroscope.

15. The method of claim 12, wherein detecting the second parameter indicative of movement of the top drive system with respect to the longitudinal axis of the top drive system with the second plurality of sensors comprises detecting strain on a surface of the mud saver valve of the top drive system with a plurality of strain gauges.

16. The method of claim 15, wherein detecting strain on the surface of the mud saver valve of the top drive system with the plurality of strain gauges comprises detecting strain on a narrowed section of an outer circumference of the mud saver valve of the top drive system.

17. The method of claim 12, comprising:
storing the power in a battery, which is disposed in the rotational portion of the mud saver valve housing.

18. A top drive movement measurement system, comprising:
   a mud saver valve;
   a mud saver valve measurement housing disposed about and coupled to the mud saver valve, the mud saver valve measurement housing comprising a rotational portion and a stationary portion, with the rotational portion configured to rotate with the mud saver valve and configured to rotate relative to the stationary portion;
   a plurality of sensors coupled to the mud saver valve or the rotational portion of the mud saver valve measurement housing, wherein the plurality of sensors is configured to detect lateral movement, compression, or tension of the mud saver valve of the top drive movement measurement system; and
   a monitoring system, comprising:
      a signal receiver configured to receive data from the mud saver valve measurement housing;
      a processor; and
      one or more non-transitory, computer-readable media having executable instructions stored thereon, the executable instructions comprising instructions that actuate an alert of the monitoring system when the plurality of sensors detects that the lateral movement exceeds a first threshold, the plurality of sensors detects that the compression or the tension exceeds a second threshold, or both, and wherein the one or more non-transitory, computer-readable media comprises at least one value stored thereon, wherein the at least one value corresponds to the first threshold, the second threshold, or both.

19. The system of claim 18, wherein the plurality of sensors comprises a linear accelerometer, a gyroscope, or both, and a plurality of strain gauges,
   wherein the plurality of strain gauges is coupled to a narrowed section of an outer circumference of the mud saver valve, and the plurality of strain gauges are disposed equidistantly about the outer circumference of the mud saver valve.

20. The system of claim 19, wherein the monitoring system comprises a display, and wherein the executable instructions comprise instructions that generate at least one output value representing the data and display the at least one output value on the display.

* * * * *

UNITED STATES PATENT AND TRADEMARK OFFICE
CERTIFICATE OF CORRECTION

PATENT NO. : 10,370,899 B2  
APPLICATION NO. : 15/589746  
DATED : August 6, 2019  
INVENTOR(S) : Brian Dale Dewald et al.

It is certified that error appears in the above-identified patent and that said Letters Patent is hereby corrected as shown below:

On the Title Page

Item (73), please delete "Nabros Drilling Technologies USA, Inc.," and insert --Nabors Drilling Technologies USA, Inc.,--

Signed and Sealed this  
Ninth Day of November, 2021

Drew Hirshfeld  
*Performing the Functions and Duties of the*  
*Under Secretary of Commerce for Intellectual Property and*  
*Director of the United States Patent and Trademark Office*